(12) United States Patent
Fleischer et al.

(10) Patent No.: US 7,743,331 B1
(45) Date of Patent: Jun. 22, 2010

(54) VIEWING AND MODIFYING CONTENT SLIDE NAVIGATION PROPERTIES

(75) Inventors: Silke Fleischer, San Marcos, CA (US); Magnus L. Nirell, Sunriver, OR (US)

(73) Assignee: Adobe Systems Inc., San Jose, CA (US)

( * ) Notice: Subject to any disclaimer, the term of this patent is extended or adjusted under 35 U.S.C. 154(b) by 777 days.

(21) Appl. No.: 11/541,408

(22) Filed: Sep. 29, 2006

(51) Int. Cl.
*G06F 3/00* (2006.01)
*G06F 3/048* (2006.01)
*G09B 7/00* (2006.01)

(52) U.S. Cl. ............... 715/731; 715/730; 715/732; 715/855; 715/854; 715/804; 434/322; 434/323

(58) Field of Classification Search ............... 715/732, 715/855, 731, 854, 730, 793, 804, 967; 434/322, 434/347, 323
See application file for complete search history.

(56) References Cited

U.S. PATENT DOCUMENTS

| | | | | |
|---|---|---|---|---|
| 6,157,364 | A * | 12/2000 | Kohler | 715/855 |
| 7,299,418 | B2 * | 11/2007 | Dieberger | 715/732 |
| 2002/0042041 | A1 * | 4/2002 | Owens et al. | 434/322 |
| 2002/0119433 | A1 * | 8/2002 | Callender | 434/322 |
| 2003/0073063 | A1 * | 4/2003 | Dattaray et al. | 434/350 |
| 2003/0077559 | A1 * | 4/2003 | Braunberger et al. | 434/322 |
| 2003/0222890 | A1 * | 12/2003 | Salesin et al. | 345/629 |
| 2005/0138570 | A1 * | 6/2005 | Good et al. | 715/789 |
| 2006/0046237 | A1 * | 3/2006 | Griffin et al. | 434/322 |
| 2008/0028313 | A1 * | 1/2008 | Ebert | 715/730 |

FOREIGN PATENT DOCUMENTS

GB 2401224 * 4/2004

OTHER PUBLICATIONS

Moscovich et al., Customizable Presentations, Oct. 2004, Brown University, CS-04-16.*

* cited by examiner

*Primary Examiner*—Tadesse Hailu
*Assistant Examiner*—Nicholas S Ulrich
(74) *Attorney, Agent, or Firm*—Chapin IP Law, LLC

(57) ABSTRACT

A system displays a set of content slides on a graphical user interface. The system identifies navigation paths between content slides in the set of content slides, each navigation path indicating a destination content slide to be displayed after a source content slide upon user selection of a navigation choice during a presentation sequence of the content slides. For each identified navigation path, the system displays a visualization of that navigation path on the graphical user interface between the source content slide and the destination content slide associated with that navigation path. The system allows a user of the graphical user interface to alter a navigation path between content slides to change the association of that navigation path between at least one of the source content slide and the destination content slide to modify the presentation sequence of the content slides.

22 Claims, 11 Drawing Sheets

211 ALLOW A USER TO DISPLAY A SUBSET OF THE SET OF CONTENT SLIDES ON THE GRAPHICAL USER INTERFACE

212 RECEIVE A GRAPHICAL SELECTION OF THE SOURCE CONTENT SLIDE

213 DISPLAY A SUBSET OF CONTENT SLIDES CONTAINING:
i) A PORTION OF THE CONTENT SLIDES WITHIN THE SET OF CONTENT SLIDES, INCLUDING THE SOURCE CONTENT SLIDE, AND
ii) THE NAVIGATION PATHS BETWEEN THE CONTENT SLIDES IN THE SUBSET OF CONTENT SLIDES

214 ALLOW A USER TO TOGGLE BETWEEN DISPLAYING:
i) THE SET OF CONTENT SLIDES AND THE NAVIGATION PATHS BETWEEN THE CONTENT SLIDES, AND
ii) THE SUBSET OF CONTENT SLIDES INCLUDING THE SOURCE CONTENT SLIDE, AND THE NAVIGATION PATHS BETWEEN THE SUBSET OF CONTENT SLIDES

*FIG. 8*

215 ALLOW A USER TO DISPLAY A SUBSET OF THE SET OF CONTENT SLIDES ON THE GRAPHICAL USER INTERFACE

216 PROVIDE A THUMBNAIL VIEW OF THE SET OF CONTENT SLIDES ON THE GRAPHICAL USER INTERFACE

217 DISPLAY A BOUNDARY ENCOMPASSING A PORTION OF CONTENT SLIDES IN THE THUMBNAIL VIEW, THE BOUNDARY CORRESPONDING TO THE PORTION OF CONTENT SLIDES DISPLAYED IN A WORK AREA ON THE GRAPHICAL USER INTERFACE

218 RECEIVE A SELECTION OF THE BOUNDARY IN THE THUMBNAIL VIEW TO MODIFY THE PORTION OF CONTENT SLIDES DISPLAYED IN THE WORK AREA TO DISPLAY AN ALTERNATE PORTION OF CONTENT SLIDES IN THE WORK AREA ON THE GRAPHICAL USER INTERFACE

*FIG. 9*

219 ALLOW A USER OF THE GRAPHICAL USER INTERFACE TO ALTER A NAVIGATION PATH BETWEEN CONTENT SLIDES TO CHANGE THE ASSOCIATION OF THAT NAVIGATION PATH BETWEEN AT LEAST ONE OF THE SOURCE CONTENT SLIDE AND THE DESTINATION CONTENT SLIDE TO MODIFY THE PRESENTATION SEQUENCE OF THE CONTENT SLIDES

220 RECEIVE A GRAPHICAL SELECTION OF A NAVIGATION PATH DISPLAYED ON THE GRAPHICAL USER INTERFACE BETWEEN THE SOURCE CONTENT SLIDE AND THE DESTINATION CONTENT SLIDE

221 RECEIVE A GRAPHICAL SELECTION TO MODIFY THE NAVIGATION PATH DISPLAYED ON THE GRAPHICAL USER INTERFACE BETWEEN THE SOURCE CONTENT SLIDE AND THE DESTINATION CONTENT SLIDE

222 RECEIVE A GRAPHICAL SELECTION TO MODIFY THE NAVIGATION PATH BETWEEN THE SOURCE CONTENT SLIDE AND THE DESTINATION CONTENT SLIDE TO A NEW NAVIGATION PATH BETWEEN THE SOURCE CONTENT SLIDE AND A NEW DESTINATION CONTENT SLIDE

223 MODIFY INTERACTION PROPERTIES ASSOCIATED WITH THE SOURCE CONTENT SLIDE

224 MODIFY INTERACTION PROPERTIES ASSOCIATED WITH THE DESTINATION CONTENT SLIDE

225 MODIFY INTERACTION PROPERTIES ASSOCIATED WITH THE NEW DESTINATION CONTENT SLIDE

226 DISPLAY NAVIGATION PATH PROPERTIES ASSOCIATED WITH THE NAVIGATION PATH

*FIG. 10*

```
┌─────────────────────────────────────────────────────────────────────────┐
│ 227 ALLOW A USER OF THE GRAPHICAL USER INTERFACE TO ALTER A             │
│ NAVIGATION PATH BETWEEN CONTENT SLIDES TO CHANGE THE ASSOCIATION        │
│ OF THAT NAVIGATION PATH BETWEEN AT LEAST ONE OF THE SOURCE              │
│ CONTENT SLIDE AND THE DESTINATION CONTENT SLIDE TO MODIFY THE           │
│ PRESENTATION SEQUENCE OF THE CONTENT SLIDES                             │
│                                                                         │
│   ┌─────────────────────────────────────────────────────────────────┐   │
│   │ 228 RECEIVE A GRAPHICAL SELECTION OF THE DESTINATION CONTENT    │   │
│   │ SLIDE TO MODIFY THE NAVIGATION PATH DISPLAYED ON THE            │   │
│   │ GRAPHICAL USER INTERFACE BETWEEN THE SOURCE CONTENT SLIDE       │   │
│   │ AND THE DESTINATION CONTENT SLIDE                               │   │
│   │                                                                 │   │
│   │   ┌─────────────────────────────────────────────────────────┐   │   │
│   │   │ 229 RECEIVE A GRAPHICAL SELECTION OF THE DESTINATION    │   │   │
│   │   │ CONTENT SLIDE TO MODIFY THE NAVIGATION PATH BETWEEN     │   │   │
│   │   │ THE SOURCE CONTENT SLIDE AND THE DESTINATION CONTENT    │   │   │
│   │   │ SLIDE TO A NEW NAVIGATION PATH BETWEEN A NEW SOURCE     │   │   │
│   │   │ CONTENT SLIDE AND THE DESTINATION CONTENT SLIDE         │   │   │
│   │   └─────────────────────────────────────────────────────────┘   │   │
│   └─────────────────────────────────────────────────────────────────┘   │
│                                    │                                    │
│                                    ▼                                    │
│   ┌─────────────────────────────────────────────────────────────────┐   │
│   │ 230 MODIFY INTERACTION PROPERTIES ASSOCIATED WITH THE           │   │
│   │ SOURCE CONTENT SLIDE                                            │   │
│   └─────────────────────────────────────────────────────────────────┘   │
│                                    │                                    │
│                                    ▼                                    │
│   ┌─────────────────────────────────────────────────────────────────┐   │
│   │ 231 MODIFY INTERACTION PROPERTIES ASSOCIATED WITH THE           │   │
│   │ DESTINATION CONTENT SLIDE                                       │   │
│   └─────────────────────────────────────────────────────────────────┘   │
│                                    │                                    │
│                                    ▼                                    │
│   ┌─────────────────────────────────────────────────────────────────┐   │
│   │ 232 MODIFY INTERACTION PROPERTIES ASSOCIATED WITH THE NEW       │   │
│   │ SOURCE CONTENT SLIDE                                            │   │
│   └─────────────────────────────────────────────────────────────────┘   │
└─────────────────────────────────────────────────────────────────────────┘
```

*FIG. 11*

VIEWING AND MODIFYING CONTENT SLIDE NAVIGATION PROPERTIES

BACKGROUND

Conventional computerized devices, such as personal computers, laptop computers, and the like utilize graphical user interface in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents (i.e., web pages, brochures, etc) and/or projects, such as a storyboard, by dragging and dropping graphical objects (i.e., text, text boxes, images, etc) into the document and/or project.

A storyboard is a digital visual overview of a sequence of events, where each event is an element in the storyboard, usually represented by a content slide, thumbnail image, icon, etc. There may be different visual items in the storyboard to represent different types of elements. A storyboard creates a presentations that allows an end user to view the content slides sequentially or according to navigation choices made by the user while interacting with the presentation.

SUMMARY

Conventional technologies for displaying and editing navigation between content slides on storyboards suffer from a variety of deficiencies. In particular, conventional technologies for displaying the navigation between content slides on storyboards are cumbersome.

In general, navigation, or branching, between the content sides is usually a non-linear sequence of executing the content slides, based on input provided to the content slides during a presentation of those slides to a user. For example, in a conventional presentation, a content slide is presented to a user, and the selection the user makes on the content slide determines the next content slide presented to the user. Typically, to develop conventional navigation, storyboard developers print out hard copies of each content slide, and arrange the content slides by taping the hard copies of the slides to a wall or laying them on a large table, and hand drawing the navigation paths to visually depict the branching between the content slides. Once the navigation paths to each slide have been manually determined using this conventional manual layout technique, the developer of the presentation can encode logic associated with each user selectable choice on interaction on a slide so that when the user is presented with that slide and chooses a particular interaction, the user is presented with the next slide associated with that interaction. Modifications to these rudimentary navigation path depictions are cumbersome, at best, since the developer must bring up each slide in an authoring tool and modify the interactions on that slide to direct a presentation to another slide. In other words, conventional tools do not present a group of slides at one time to allow for editing of navigation between those slides in a graphical manner.

Additionally, many presentations are produced for electronic training purposes and such presentations often require the ability to tabulate a score or ranking to a users choices as the user navigates through a particular presentation. Different navigation paths may result in a user receiving a different score at the end of the presentation. Conventional technologies for depicting navigation paths do not provide an elegant approach for adjusting or modifying a ranking of content slides according to a score assigned to each slide based on the branching path from that content slide to the next content slide. Conventional authoring tools treat slide authoring, slide navigation and slide ranking as separate aspects of the presentation and do not provide a single graphical user interface that allows modification of each of these aspects of presentation creation without the requirement to visit different graphical user interfaces. In contrast, the present disclosure teaches a system that combines branching and navigation editing along with slide ranking or scoring into a single graphical user interface.

Conventional technologies do not provide a simple and quick method of developing complex branched scenarios within a content development tool while viewing other properties of slides, such as scoring or ranking information. Using conventional techniques, the branching and storyboarding is developed outside of authoring tools. Developing scenario-based training, for example, is a time consuming process using conventional techniques. There exists no easy conventional method by which to simplify the generation of a content slide prototype within an authoring tool.

Embodiments disclosed herein significantly overcome such deficiencies and provide a system that includes a computer system executing a content slide navigating process within a graphical user interface. The content slide navigating process creates a visual overview of the branching (i.e., navigation paths) between a set of content slides, and allows for quick editing of the navigation paths as well as viewing and optionally editing of scoring and/or ranking information associated with each slide via a single graphical user interface. During operation, a navigation path may exist between, for example, a source content slide and a destination content slide. The content slide navigating process maintains interaction properties for all of the content slides (i.e., including the destination content slide and the source content slide). Interaction properties can also include properties related to the content slide (such as the name associated with the content slide, etc.) as well as rankings or scoring associated with selection of that content slide by a user for each navigation path available from that slide.

The content slide navigating process disclosed herein allows a user to select a slide, such as the destination content slide (or a navigation path between slides) and rearrange the navigation path for that content slide by moving the selected content slide or path within the graphical user interface to a new content slide. The content slide navigating process displays the new navigation paths and updates interaction properties for the previous source content slide, the new source content slide and the destination content slide. The navigation path can be modified by selecting the destination content slide, the navigation path or by modifying interaction properties for the destination content slide via a menu. In other words, the system disclosed herein allows a user to view, for example, thumbnails of content slides available in a presentation as well as paths between those slides for various navigation choices available with the content of those slides. The user is able to graphically select, for example, a path between to slides, and is able to graphically modify that path to be directed to a different content slide that its original destination slide (the slide to which that path lead to before being selected). In this manner, the user can quickly view and modify navigation between slides.

When a path from a particular slide is selected in the graphical user interface, interaction properties for that slide appear on the same graphical user interface. The user can thus see for example, which destination slide a user will be taken to if they select a particular navigation choice from a particular source slide. The user can modify this destination slide, for example, by changing the interaction property (e.g. a pull down menu) to indicate a new slide. Other interaction properties can be displayed and modified as well in this same graphical user interface, such as scoring or ranking for that path, etc.

Interaction properties of the content slides can include a branching decision that occurs if, for example, an end user, when presented with a content slide, does not make any selection on the content slide. Thus, the interaction properties of a content slide may include a branching display based on an end user's selection, and the branching display of the content slides if the user does not make any selection, for example, within a certain period of time.

The user can also modify the position of, for example, a destination content slide, by selecting the destination content slide and moving the destination content slide to the new desired location (i.e., dragging and dropping the destination content slide to the correct position within the set of content slides.

The content slide navigating process allows a user to choose to view a subset of the set of content slides by selecting an icon on a content slide. When the set of content slides is displayed within the graphical user interface, selecting the icon collapses the view to display only the subset of content slides that branch to the content slide (i.e., the subset of content slides for which the content slide is a destination content slide), but none of the content slides that branch from the content slide (i.e., the subset of content slides for which the content slide is a source content slide). Within this view of the subset of content slides, selecting the icon on the content slide expands the view to display the set of content slides including that branch to the content slide and the content slides that branch from the content slide.

The content slide navigating process allows the user to view a subset of the content slides via a thumbnail view of the content slides. The thumbnail view displays a bird's eye view of the complete set of content slides wherein the content slides are represented by thumbnail views (i.e., a significantly reduced size compared to the content slides displayed on the graphical user interface). The set of content slides displayed within the thumbnail view are surrounded by a boundary. Those thumbnail view content slides that are encompassed by the boundary correspond to the content slides that are displayed within the graphical user interface. In other words, the thumbnail view displays all the content slides within the set of content slides, including those slides that are included in the set of content slides, but are not displayed on the graphical user interface, due to real estate constraints within the graphical user interface. By repositioning the boundary, the user can modify which of the content slides within the set of content slides are displayed within the graphical user interface.

The content slide navigating process displays a set of content slides on a graphical user interface, and identifies navigation paths between content slides in the set of content slides. Each navigation path indicates a destination content slide to be displayed after a source content slide upon user selection of a navigation choice during a presentation sequence of the content slides. For each identified navigation path, the content slide navigating process displays a visualization of that navigation path on the graphical user interface between the source content slide and the destination content slide associated with that navigation path. This allows a user of the graphical user interface to alter a navigation path between content slides to change the association of that navigation path between at least one of the source content slide and the destination content slide to modify the presentation sequence of the content slides. The content slide navigating process displays interaction properties associated with a navigation path. The interaction properties define metrics assigned to the navigation choice associated with the navigation path within the content slide. This allows a user of the graphical user interface to alter the interaction properties associated with the navigation path. The content slide navigating process performs operations of displaying a set of content slides, displaying a visualization of navigation paths, allowing a user of the graphical user interface to alter a navigation path between content slides, displaying interaction properties, and allowing a user of the graphical user interface to alter interaction components associated with the navigation path, within a single common graphical user interface.

During an example operation of one embodiment, suppose a user, such as a storyboard developer, is creating a training presentation comprising a set of content slides with navigation paths between the content slides. The content slide navigating process displays the set of content slides on the graphical user interface, along with the navigation path between the content slides. The navigation paths depict the branching relationships between the content slides. The storyboard developer can expand or collapse the set of content slides displayed on the graphical user interface by selecting an icon on a content slide.

Via a menu, the storyboard developer can assign a ranking to each of the content slides, such as a score associated with each content slide. The scores are based on selections a user (i.e., an end user interacting with the content slides that comprises the training presentation) makes when presented with each of the content slides. For example, the end user is presented with a first content slide containing a 'yes' or 'no' selection option. If the end user chooses 'yes', the second content slide is presented to the end user. If the end user chooses 'no', the third content slide is presented to the end user. The preferable choice is that the end user selects 'yes' when presented with the first content slide. Thus, the second content slide is assigned a score of five, whereas the third content slide is assigned a score of one.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 8 illustrates a flowchart of a procedure performed by the system of FIG. 1 when the content slide navigating process allows a user to display a subset of the set of content slides on the graphical user interface, according to one embodiment disclosed herein.

FIG. 9 illustrates a flowchart of a procedure performed by the system of FIG. 1 when the content slide navigating process allows a user to display a subset of the set of content slides on the graphical user interface, and provides a thumbnail view of the set of content slides on the graphical user interface, according to one embodiment disclosed herein.

FIG. 10 illustrates a flowchart of a procedure performed by the system of FIG. 1 when the content slide navigating process allows a user of the graphical user interface to alter a navigation path between content slides to change the association of that navigation path, and receives a graphical selection of a navigation path displayed on the graphical user interface between the source content slide and the destination content slide, according to one embodiment disclosed herein.

FIG. 11 illustrates a flowchart of a procedure performed by the system of FIG. 1 when the content slide navigating process allows a user of the graphical user interface to alter a navigation path, and receives a graphical selection of the destination content slide to modify the navigation path displayed on the graphical user interface between the source content slide and the destination content slide, according to one embodiment disclosed herein.

DETAILED DESCRIPTION

Figure 1:
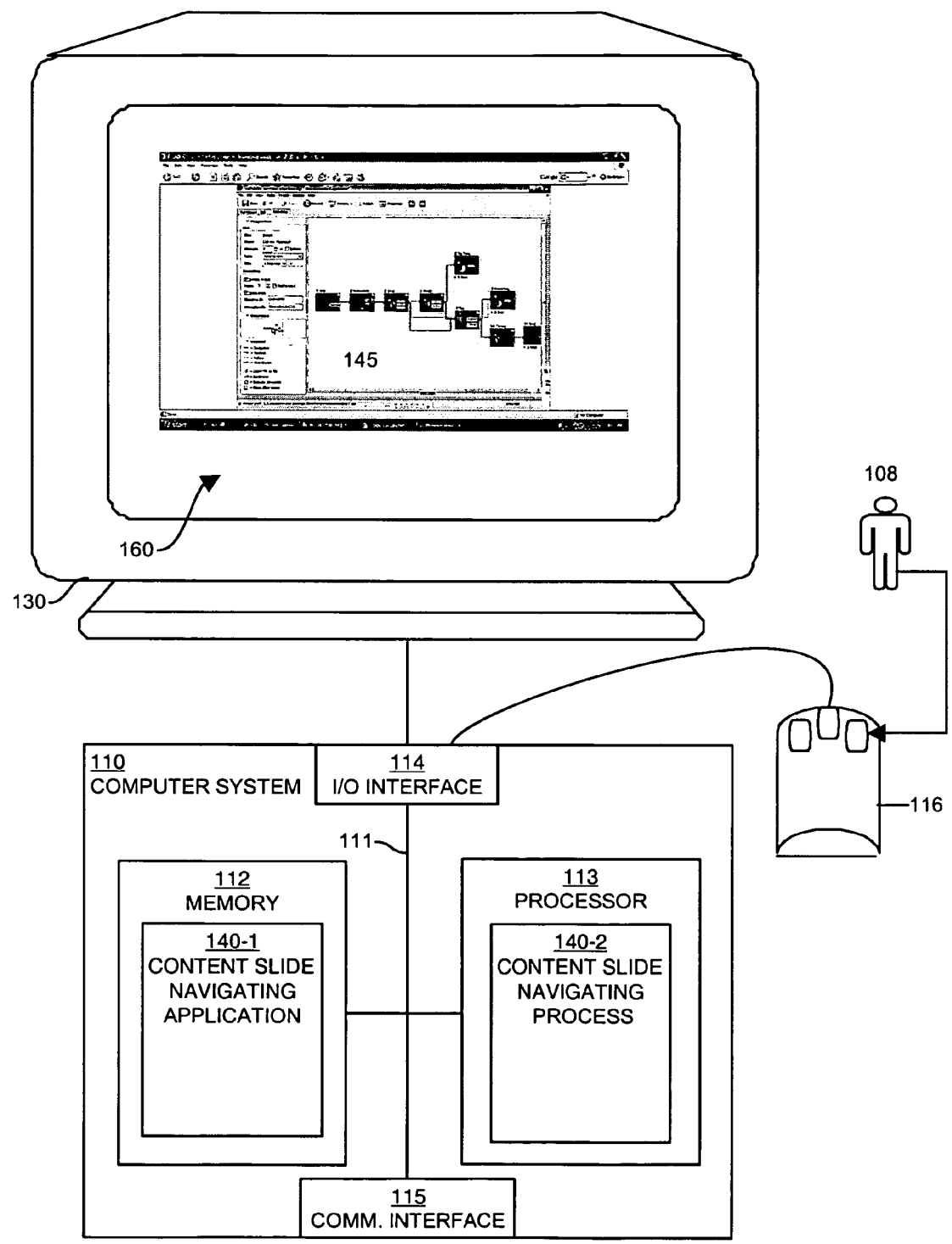
FIG. 1 shows a high-level block diagram of a computer system according to one embodiment disclosed herein.

Embodiments disclosed herein include methods and a computer system that perform a content slide navigating process within a graphical user interface. The content slide navigating process creates a visual overview of the branching (i.e., navigation paths) between a set of content slides, and allows for quick editing of the navigation paths as well as interaction properties of those paths between slides. A navigation path exists between, for example, a source content slide and a destination content slide. The content slide navigating process maintains interaction properties for all of the content slides (i.e., including the destination content slide and the source content slide). Interaction properties can include properties related to the content slide (such as the name associated with the content slide, etc.) as well as rankings associated with selection of that content slide by a user when a user chooses a particular navigation choice or interaction from a source slide that is associated with (i.e. that follows) a navigation path from that source slide to a destination slide.

The content slide navigating process allows a user, for example, to select a destination content slide or navigation path, and to rearrange the navigation path for that destination content slide by moving the destination content slide (or dragging the path) within the graphical user interface from the previous source content slide to a new source content slide. The content slide navigating process displays the new navigation paths and updates interaction properties for the previous source content slide, the new source content slide and the destination content slide. The navigation path can be modified by selecting the destination content slide, the navigation path itself or by modifying interaction properties for the destination content slide via a menu.

The content slide navigating process allows a user to choose to view a subset of the set of content slides by selecting an icon on a content slide. When the set of content slides is displayed within the graphical user interface, selecting the icon on one slide (e.g. a "-" sign in an upper corner of a thumbnail view of a given slide) collapses the view of to display only the subset of content slides that branch away from the content slide (i.e., the subset of content slides for which the content slide is a source content slide), but none of the content slides that branch to the content slide (i.e., the subset of content slides for which the content slide is a destination content slide). As an example, consider a horizontal tree view of content slides in which one source slide in the tree has three navigation paths extending to three respective destination content slides. If the user selects the icon on the source slide, the three destination slides are condensed into a single representation, allowing the viewer to thus condense certain groups of navigation paths in the tree view. Within this view of the subset of content slides, selecting the icon on the content slide expands the view to display the set of content slides including that branch to the content slide and the content slides that branch from the content slide and so forth.

Interaction properties of the content slides can include a branching decision that occurs if, for example, an end user, when presented with a content slide, does not make any selection on the content slide. Thus, the interaction properties of a content slide may include a branching display based on an end user's selection, and the branching display of the content slides if the user does not make any selection, for example, within a certain period of time.

The user can also modify the position of, for example, a destination content slide, by selecting the destination content slide and moving the destination content slide to the new desired location (i.e., dragging and dropping the destination content slide to the correct position within the set of content slides.

The content slide navigating process allows the user to view a subset of the content slides via a thumbnail view of the content slides. The thumbnail view displays a bird's eye view of the complete set of content slides wherein the content slides are represented by thumbnail views (i.e., a significantly reduced size compared to the content slides displayed on the graphical user interface). The set of content slides displayed within the thumbnail view are surrounded by a boundary. Those thumbnail view content slides that are encompassed by the boundary correspond to the content slides that are displayed within the graphical user interface. In other words, the thumbnail view displays all the content slides within the set of content slides, including those slides that are included in the set of content slides, but are not displayed on the graphical user interface, due to real estate constraints within the graphical user interface. By repositioning the boundary, the user can modify which of the content slides within the set of content slides are displayed within the graphical user interface.

The content slide navigating process displays a set of content slides on a graphical user interface, and identifies navigation paths between content slides in the set of content slides. Each navigation path indicates a destination content slide to be displayed after a source content slide upon user selection of a navigation choice during a presentation sequence of the content slides.

Additionally, a content slide may have a default navigation path coupling a source content slide to a default destination content slide in the event a user does not make a navigation choice during the presentation. As an example, a content slide might have one or more user selectable navigation choices available for selection within a content slide. For each user selectable navigation choice, a user can define a navigation path that is graphically displayed that links this source slide to a destination slide. Additionally, a user can specify a navigation path to a particular destination slide that presentation software will follow (during a presentation sequence of the slides) in the event the user does not make any navigation choice. This default navigation path may be followed, for example, after expiration of a time limit (e.g. if no navigation choice is made for 30 seconds).

For each identified navigation path, the content slide navigating process displays a visualization of that navigation path on the graphical user interface between the source content slide and the destination content slide associated with that navigation path. By providing a visualization of both the content slides (e.g. as thumbnail sized icons) and navigation paths between the slides, the content slide navigating process disclosed herein allows the user developing the presentation can graphically see the overall flow of different paths that an end user (a user viewing a presentation sequence) may take as he or she proceeds through the presentation. Additionally, the developer user is able to graphically alter the navigation path via drag and drop of one or both ends of a path to a different slide, or by editing interaction properties including navigation properties that specify what destination slide a particular navigation path (from a source slide) with take a user to during the presentation sequence. This allows a user of the graphical user interface to alter a navigation path between content slides to change the association of that navigation path between at least one of the source content slide and the destination content slide to modify the presentation sequence of the content slides. The content slide navigating process displays interaction properties associated with a navigation path. The interaction properties define metrics assigned to the navigation choice associated with the navigation path within the content slide. This allows a user of the graphical user interface to alter the interaction properties associated with the navigation path. The content slide navigating process performs operations of displaying a set of content slides, displaying a visualization of navigation paths, allowing a user of the graphical user interface to alter a navigation path between content slides, displaying interaction properties, and allowing a user of the graphical user interface to alter interaction components associated with the navigation path, within a single common graphical user interface.

FIG. 1 is a block diagram illustrating example architecture of a computer system 110 that executes, runs, interprets, operates or otherwise performs a content slide navigating application 140-1 and content slide navigating process 140-2 suitable for use in explaining example configurations, according to one embodiment disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the content slide navigating application 140-1 and process 140-2 provides on the display 130. The graphical user interface 160 displays a storyboard 145 containing a set of content slides 155-N including navigation paths 150 connecting the content slices 155-N. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a content slide navigating application 140-1 as explained herein. The content slide navigating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the content slide navigating application 140-1. Execution of the content slide navigating application 140-1 in this manner produces processing functionality in a content slide navigating process

140-2. In other words, the content slide navigating process 140-2 represents one or more portions or runtime instances of the content slide navigating application 140-1 (or the entire content slide navigating application 140-1) performing or executing within or upon the processor 113 in the computerized device 110 at runtime.

It is noted that example configurations disclosed herein include the content slide navigating application 140-1 itself (i.e., in the form of un-executed or non-performing logic instructions and/or data). The content slide navigating application 140-1 may be stored on a computer readable medium (such as a floppy disk), hard disk, electronic, magnetic, optical, or other computer readable medium. The content slide navigating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the content slide navigating application 140-1 in the processor 113 as the content slide navigating process 140-2. Those skilled in the art will understand that the computer system 110 may include other processes and/or software and hardware components, such as an operating system not shown in this example.

A display 130 need not be coupled directly to computer system 110. For example, the content slide navigating application 140-1 can be executed on a remotely accessible computerized device via the network interface 115. In this instance, the graphical user interface 160 may be displayed locally to a user 108 of the remote computer and execution of the processing herein may be client-server based.

Figure 2:
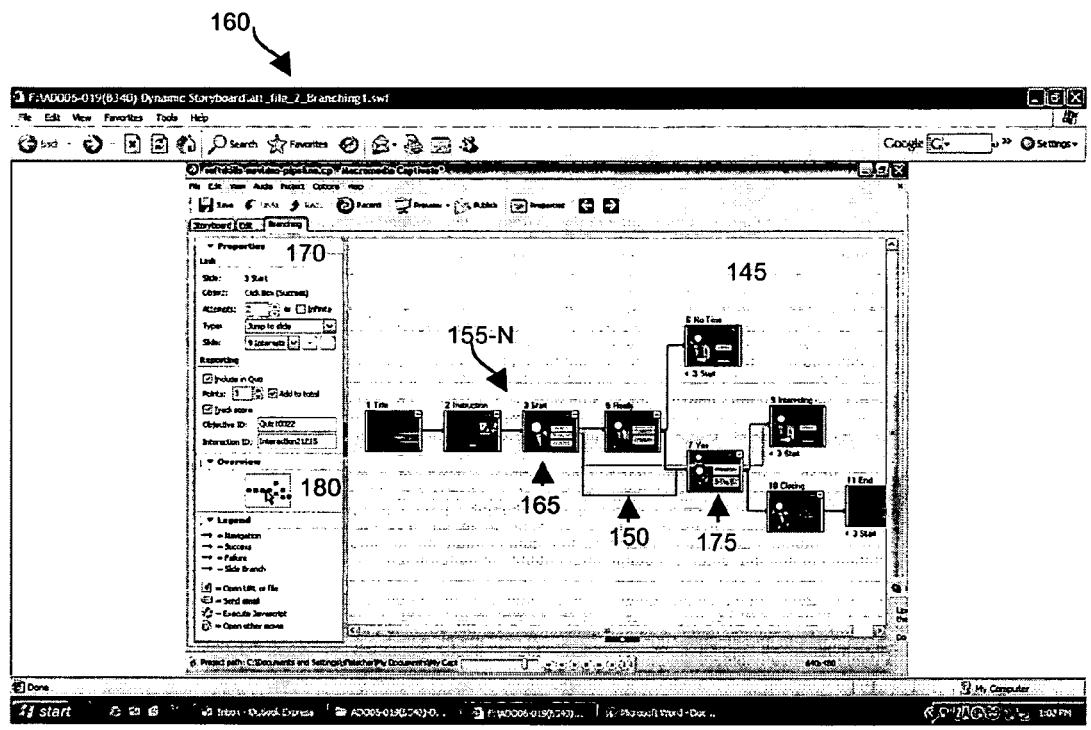
FIG. 2 shows an example screenshot of a graphical user interface displaying a storyboard containing a set of content slides depicted with navigation paths connecting the set of content slides.

FIG. 2 displays an example screen shot of a storyboard 145 containing a set of content slides 155-N connected by navigation paths 150. The set of content slides 155-N includes a source content slide 165 and a destination content slide 175. The content slide navigating process 140-2 provides interaction properties 170 for the content slides 155-N, as well as a thumbnail view 180 of the content slides 155-N. The thumbnail view 180 depicts those content slides 155-N that are displayed within the work area of the storyboard 145.

Figure 3:
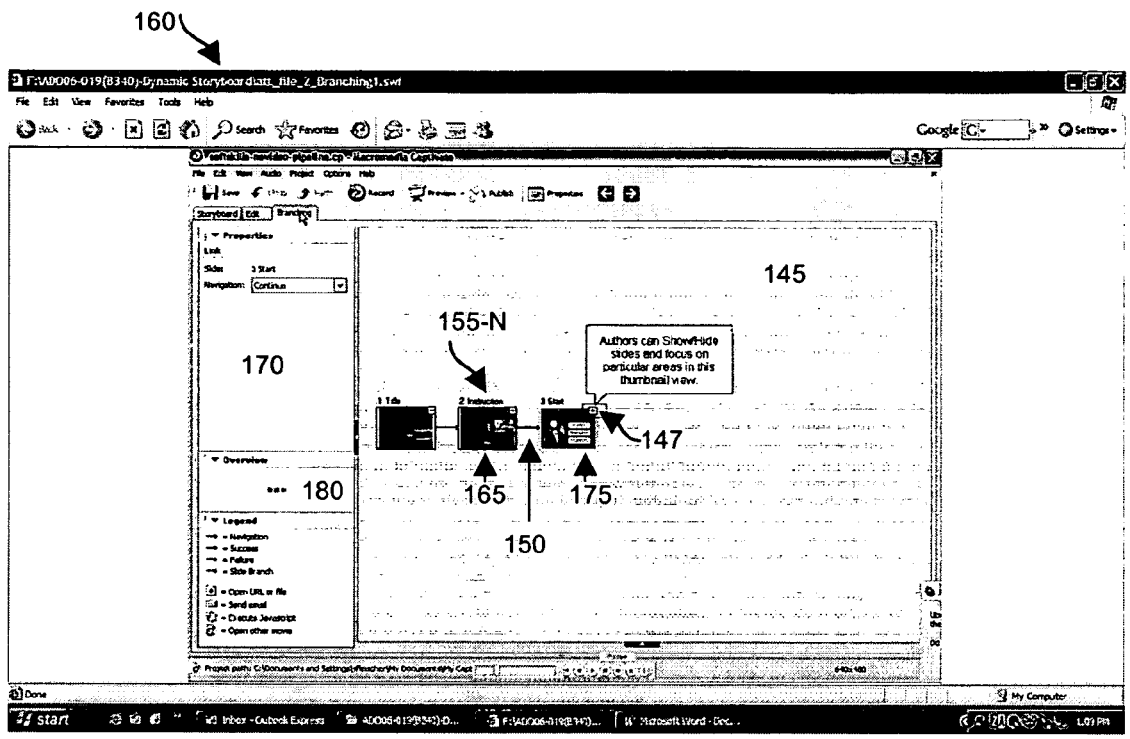
FIG. 3 shows an example screenshot of a graphical user interface displaying a storyboard containing a subset of the set of content slides as selected by a user.

FIG. 3 displays an example screen shot of a storyboard 145 containing a set of content slides 155-N connected by navigation paths 150. The set of content slides 155-N includes a source content slide 165 and a destination content slide 175. The content slide navigating process 140-2 provides interaction properties 170 for the content slides 155-N, as well as a thumbnail view 180 of the content slides 155-N. FIG. 3 displays an icon 147 on a destination content slide 175 (that is in collapsed form in this view) that allows a user 108 to collapse or expand the display of content slides 155-N within the work area of the storyboard 145. Clicking icon 147 will thus cause any destination slides from source slides 175 to expand and appear in the graphical user interface (there happen to be none in this example).

Figure 4:
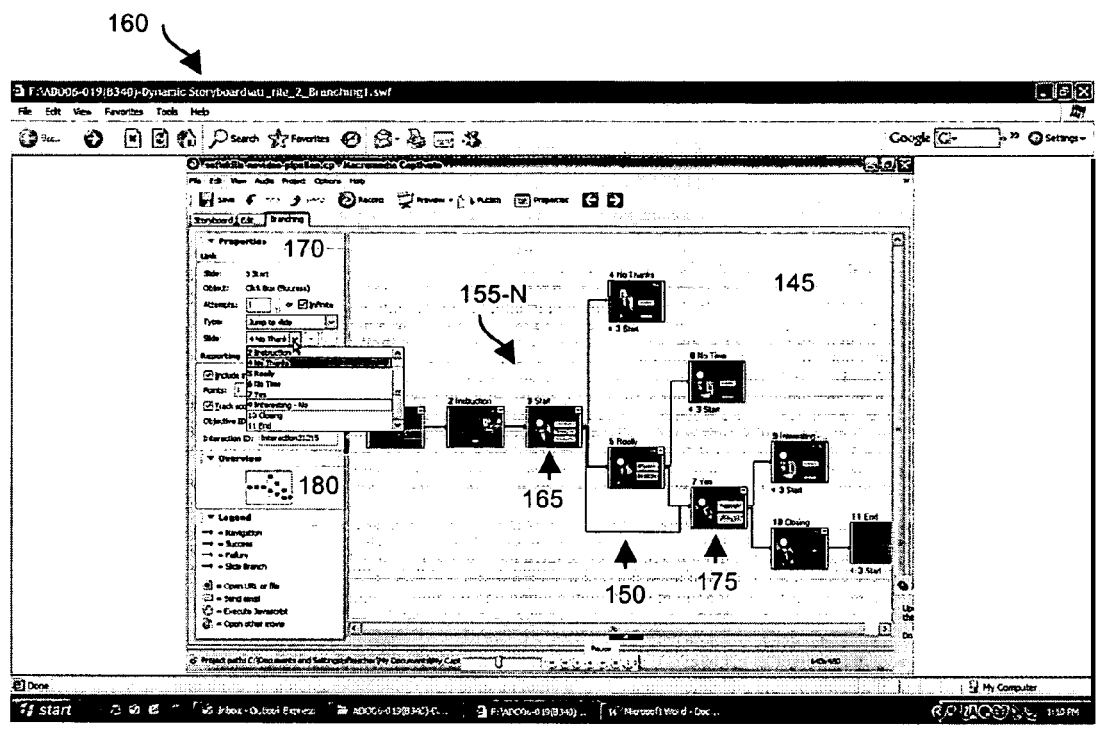
FIG. 4 shows an example screenshot of a graphical user interface displaying a storyboard containing a menu to allow a user to modify interaction properties associated with a set of content slides.

FIG. 4 displays an example screen shot of a storyboard 145 containing a set of content slides 155-N connected by navigation paths 150. The set of content slides 155-N includes a source content slide 165 and a destination content slide 175. The content slide navigating process 140-2 provides interaction properties 170 for the content slides 155-N, as well as a thumbnail view 180 of the content slides 155-N. The interaction properties 170 allow a user 108 to modify a navigation path 150 between the source content slide 165 and the destination content slide 175 via a drop down menu.

Further details of configurations explained herein will now be provided with respect to a flow chart of processing steps that show the high level operations disclosed herein to perform the content slide navigating process 140-2.

Figure 5:
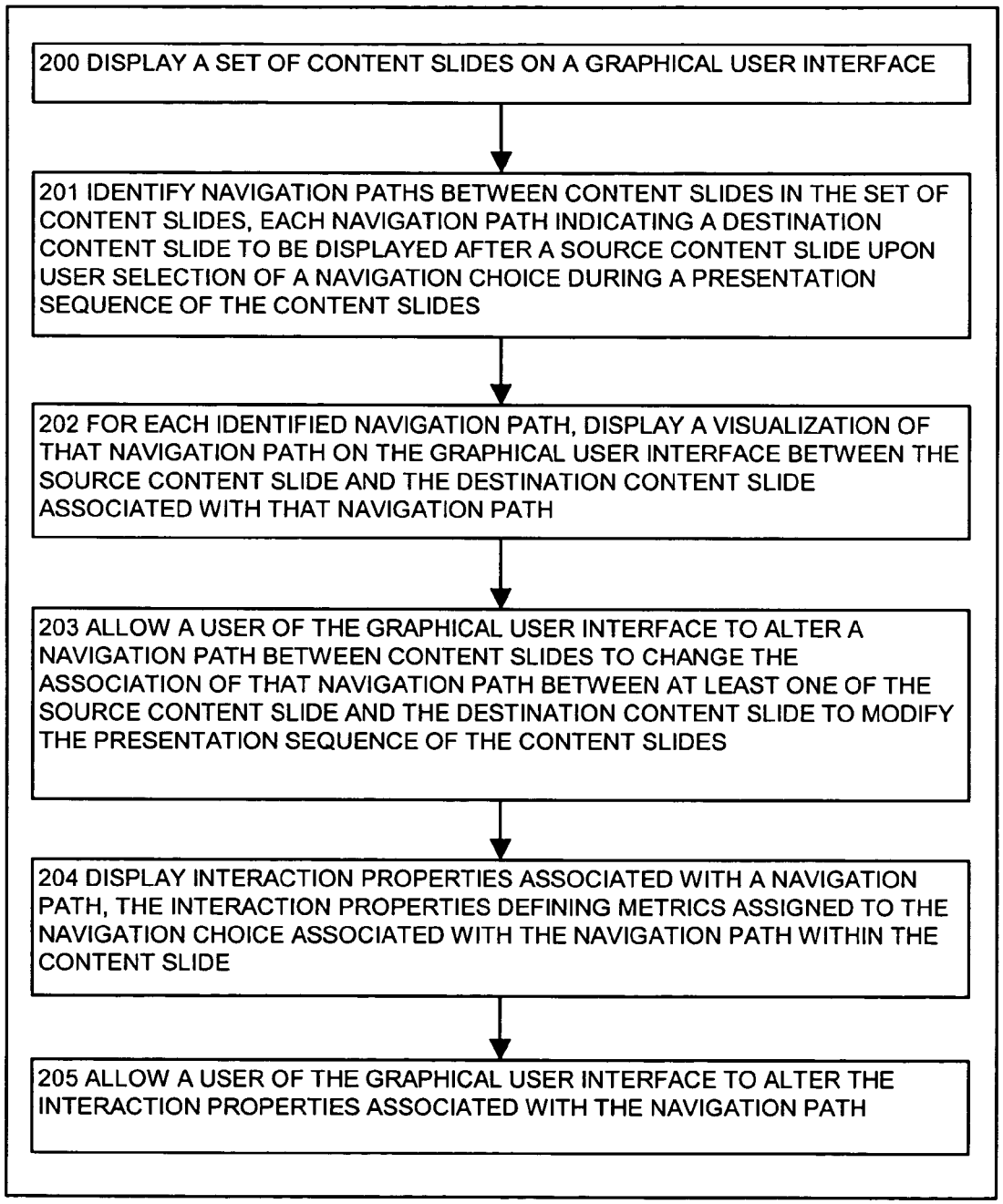
FIG. 5 illustrates a flowchart of a procedure performed by the system of FIG. 1 when the content slide navigating process displays a set of content slides on a graphical user interface, according to one embodiment disclosed herein.

FIG. 5 is a flowchart of the steps performed by the content slide navigating process 140-2 when it displays a set of content slides 155-N on a graphical user interface 160.

In step 200, the content slide navigating process 140-2 displays a set of content slides 155-N on a graphical user interface 160. The set of content slides 155-N can be, for example, a training presentation in which an end user interacts with the set of content slides 155-N. The content slides 155-N may have interaction areas, such as areas on the slides 155-N where an end user selects (i.e., 'clicks' on the content slide 155), form fields for data entry, quiz questions, etc.

In step 201, the content slide navigating process 140-2 identifies navigation paths 150 between content slides 155-N in the set of content slides 155-N. Each navigation path indicates a destination content slide 175 to be displayed after a source content slide 165, upon user selection of a navigation choice during a presentation sequence of the content slides 155-N. For example, a content slide 155, such as a source content slide 165, may have a multiple-choice question that an end user must answer. The end user's answer determines which content slide 155 (i.e., the destination content slide 175) is next presented to the end user. Thus, the flow of the presentation of the content slides 155-N is not necessarily sequential, but rather follows a branching format as determined by the developer of the storyboard 145, and as identified by the content slide navigating process 140-2.

For each identified navigation path 150, in step 202, the content slide navigating process 140-2 displays a visualization of that navigation path on the graphical user interface 160 between the source content slide 165 and the destination content slide 175 associated with that navigation path 150. The content slide navigating process 140-2 displays the navigation paths 150 that connect the content slides 155-N. In an example embodiment, the navigation paths 150 are color coded to indicate additional interaction information associated with the content slides 155-N. For example, a navigation path 150 between a source content slide 165 and a destination content slide 175 that indicates a successful interaction, may be depicted as one color whereas a navigation path 150 between a source content slide 165 and a destination content slide 175 that indicates an unsuccessful interaction, may be depicted as a different color.

In step 203, the content slide navigating process 140-2 allows a user 108 (such as a storyboard developer) of the graphical user interface 160 to alter a navigation path 150 between content slides 155-N to change the association of that navigation path 150 between at least one of the source content slide 165 and the destination content slide 175 to modify the presentation sequence of the content slides 155-N. A user 108, such as a storyboard developer, can modify the navigation paths 150 via a menu, or by manually modifying the navigation path 150 via the navigation path 150, or by manually modifying the position of one of the content slides 155-N to which the navigation path 150 is associated.

In step 204, the content slide navigating process 140-2 displays interaction properties 170 associated with a navigation path 150. The interaction properties define metrics assigned to the navigation choice associated with the navigation path 150 within the content slide 155. In an example configuration, the interaction properties 170 are displayed within the graphical user interface 160 as a set of drop down menus and form fields. Interaction properties 170 can include the number of attempts a user 108, such as an end user, is allowed to make a selection (for example, answer a multiple choice question) on a content slide 155. The interaction properties 170 also allow a user 108 to modify the navigation paths between, for example, a source content slide 165 and a destination content slide 175.

In step 205, the content slide navigating process 140-2 allows a user 108 of the graphical user interface 160 to alter the interaction properties 170 associated with the navigation path 150. The content slide navigating process 140-2 provides user 108, such as a storyboard developer, with the capability to modify the interaction properties 170 associated with each of the navigation paths 150. For example, one type of interaction property 170 of a source content slide 165 is the destination content slide 175 presented to a user 108 upon after presentation of the source content slide 165. The content slide navigating process 140-2 allows a user 108 to modify that interaction by changing the destination content slide 175 originally associated with the source content slide 165 to a different destination content slide 175.

Figure 6:
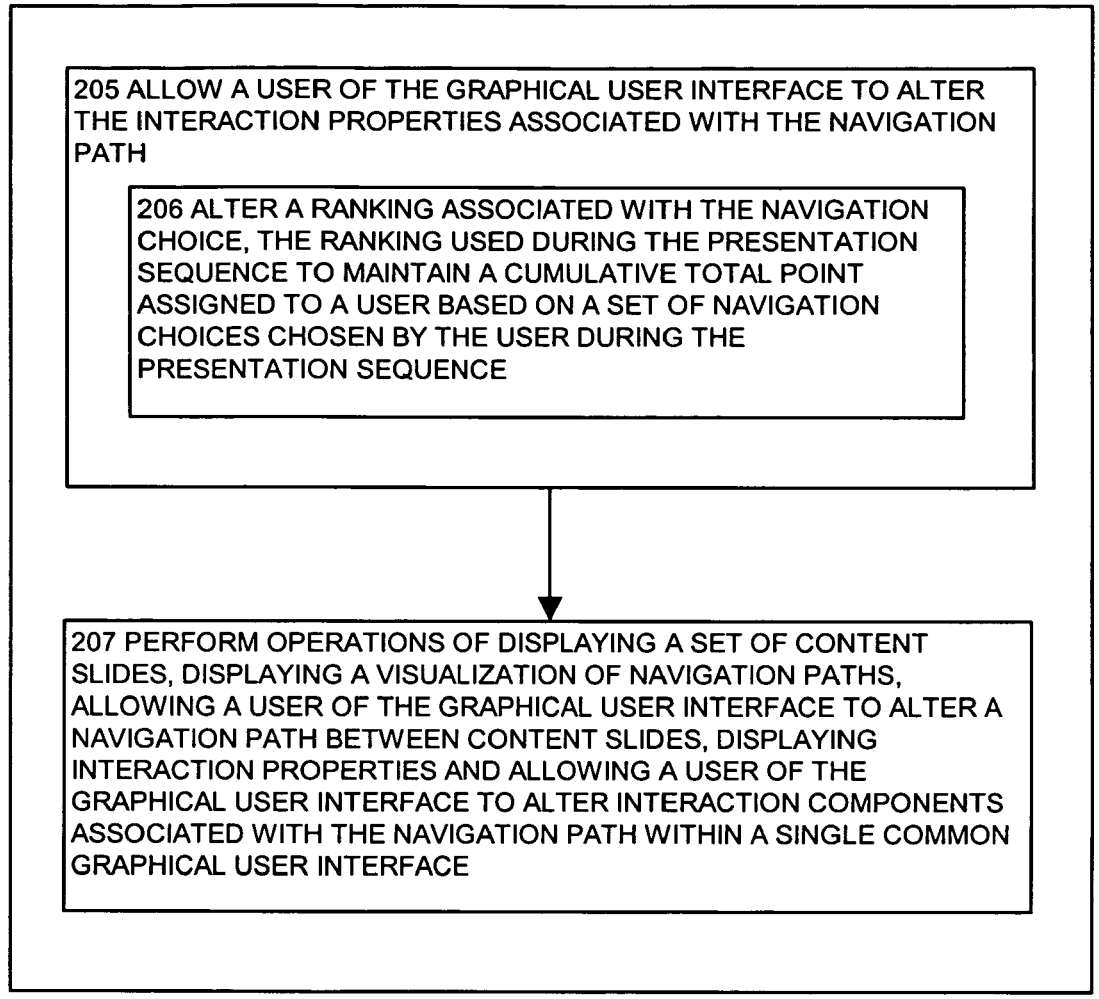
FIG. 6 illustrates a flowchart of a procedure performed by the system of FIG. 1 when the content slide navigating process allows a user of the graphical user interface to alter the interaction properties associated with the navigation path, according to one embodiment disclosed herein.

FIG. 6 is a flowchart of a continuation of FIG. 5 of the steps performed by the content slide navigating process 140-2 when it allows a user 108 of the graphical user interface 160 to alter the interaction properties 170 associated with the navigation path 150.

In step 206, the content slide navigating process 140-2 alters a ranking associated with the navigation choice. The ranking is used during the presentation sequence to maintain a cumulative total point assigned to a user 108 based on a set of navigation choices chosen by the user 108 during the presentation sequence. A user 108, such as a storyboard developer, can assign a rank or score to each of the content slides 155-N. For example, a user 108, such as an end user, is presented with a source content slide 155-1 that contains a multiple choice question, each of the choices resulting in a different destination content slide 155-N being presented to the user 108. Each of those different destination content slides 155-N has a different ranking. The content slide navigating process 140-2 allows a user 108, such as a storyboard developer, to alter the ranking assigned to each of the destination content slides 155-N. Thus, the content slide navigating process 140-2 allows a user 108, such as a storyboard developer, to provide a resulting score during the presentation of the set of content slide 155-N to an end user.

In step 207, the content slide navigating process 140-2 perform operations of:
  i) displaying a set of content slides 155-N,
  ii) displaying a visualization of navigation paths 150,
  iii) allowing a user 108 of the graphical user interface 160 to alter a navigation path 150 between content slides 155-N,
  iv) displaying interaction properties 170, and
  v) allowing a user 108 of the graphical user interface 160 to alter interaction components associated with the navigation path 150 within a single common graphical user interface 160.

The content slide navigating process 140-2 provides a work area in which the set of content slides 155-N are displayed, or a subset of the content slides 155-N, if the number of content slides 155-N in the set of content slides 155-N is too large to fit within the work are in the graphical user interface 160.

Figure 7:
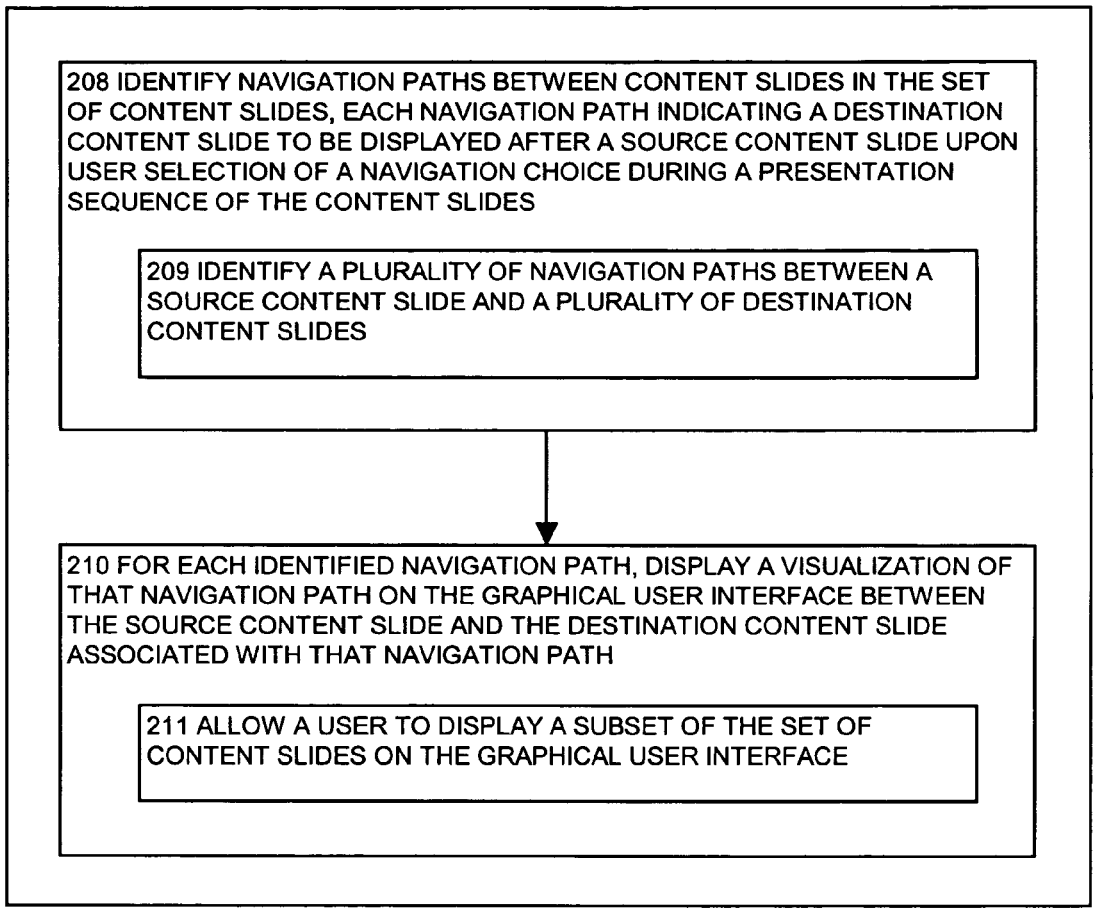
FIG. 7 illustrates a flowchart of a procedure performed by the system of FIG. 1 when the content slide navigating process identifies navigation paths between content slides in the set of content slides, according to one embodiment disclosed herein.

FIG. 7 is a flowchart of the steps performed by the content slide navigating process 140-2 when it identifies navigation paths 150 between content slides 155-N in the set of content slides 155-N.

In step 208, the content slide navigating process 140-2 identifies navigation paths 150 between content slides 155-N in the set of content slides 155-N. Each navigation path indicates a destination content slide 175 to be displayed after a source content slide 175 upon user 108 selection of a navigation choice during a presentation sequence of the content slides 155-N. Essentially, the destination content slide 175 is the 'next' content slide 155 that is presented to the user 108, such as an end user, after the source content slide 165 is presented to the user 108, and the user 108 makes a selection on the source content slide 165. For example, the source content slide 165 may contain a 'yes' or 'no' question. The user's 108 answer to that 'yes' or 'no' question determines which destination content slide 175 is presented next to the user 108.

In step 209, the content slide navigating process 140-2 identifies a plurality of navigation paths 150 between a source content slide 165 and a plurality of destination content slides 175. A source content slide 165 may have more than one destination content slide 175 presented to a user 108, based on, for example, a selection the user 108, such as an end user, makes when presented with the source content slide 165. For example, a source content slide 165 presents a multiple choice question to the user 108 that gives the user 108 three options to choose from. Each of those three options provides a different navigation path 150 to a different destination content slide 175. The choice the user 108 selects determines which of the three destination content slide 175 is next presented to the user 108.

For each identified navigation path 150, in step 210, the content slide navigating process 140-2 displays a visualization of that navigation path 150 on the graphical user interface 160 between the source content slide 165 and the destination content slide 175 associated with that navigation path 150. The work area of the storyboard 145 displays the set of content slides 155-N and the navigation paths 150 that connect the content slides 155-N.

In step 211, the content slide navigating process 140-2 allows a user 108 to display a subset of the set of content slides 155-N on the graphical user interface 160. In an example embodiment, the number of content slides 155-N within the set of content slides 155-N is too large for all of the content slides 155-N to be displayed on the graphical user interface 160. The content slide navigating process 140-2 allows a user 108 to determine which subset of the set of content slides 155-N to display on the graphical user interface 160. Then the content slide navigating process 140-2 displays the selected subset of the set of content slides 155-N on the graphical user interface 160.

FIG. 8 is a flowchart of a continuation of FIG. 7 of the steps performed by the content slide navigating process 140-2 when it allows a user 108 to display a subset of the set of content slides 155-N on the graphical user interface 160.

In step 212, the content slide navigating process 140-2 receives a graphical selection of the source content slide 165. In an example embodiment, the source content slide 165 has displays an icon, that, when selected, allows a user 108 to display a subset of the set of content slides 155-N on the graphical user interface 160.

In response to receiving a graphical selection of the source content slide 165, in step 213, the content slide navigating process 140-2 displays a subset of content slides 155-N containing:
  i) a portion of the content slides 155-N within the set of content slides 155-N, including the source content slide 165, and
  ii) the navigation paths 150 between the content slides 155-N in the subset of content slides 155-N.

In one embodiment, a user 108 selects a source content slide 165, and the content slide navigating process 140-2 collapses the display of the set of content slides 155-N, such that none of the content slides 155-N that are presented to a user 108 after the presentation of the source content slide 165, are displayed on the graphical user interface 160. In another embodiment, a user 108 selects a source content slide 165, and the content slide navigating process 140-2 collapses the display of the set of content slides 155-N, such that none of the content slides 155-N that are presented to a user 108 before the presentation of the source content slide 165, are displayed on the graphical user interface 160.

In step 214, the content slide navigating process 140-2 allows a user to toggle between displaying:
i) the set of content slides 155-N and the navigation paths 150 between the content slides 155-N, and
ii) the subset of content slides 155-N including the source content slide 165, and the navigation paths 150 between the subset of content slides 155-N.

In an example embodiment, the content slide navigating process 140-2 allows a user to select the icon when the display of content slides 155-N has been collapsed, and expand the display to include those content slides 155-N that were displayed prior to the selection of the icon (i.e., the selection of the icon that resulted in the collapsing of the display). The icon on the source content slide 165 indicates whether the display of content slides 155-N has been collapsed or expanded, for example, with a 'plus' or 'minus' indicator. Thus, the user 108 can toggle between expanding and collapsing the display of the set of content slides 155-N on the graphical user interface 160.

FIG. 9 is a flowchart of the steps performed by the content slide navigating process 140-2 when it allows a user 108 to display a subset of the set of content slides 155-N on the graphical user interface 160.

In step 215, the content slide navigating process 140-2 allows a user 108 to display a subset of the set of content slides 155-N on the graphical user interface 160. In an example embodiment, the number of content slides 155-N within the set of content slides 155-N is too large for all of the content slides 155-N to be displayed on the graphical user interface 160, and only a subset of the set of content slides 155-N is displayed in a work area of the storyboard 145 on the graphical user interface 160. The content slide navigating process 140-2 allows a user 108 to determine which subset of the set of content slides 155-N to display on the graphical user interface 160. Then the content slide navigating process 140-2 displays the selected subset of the set of content slides 155-N on the graphical user interface 160.

In step 216, the content slide navigating process 140-2 provides a thumbnail view 180 of the set of content slides 155-N on the graphical user interface 160. The thumbnail view 180 contains a depiction of the set of content slides 155-N, including those content slides 155-N that are not be displayed within the work area of the graphical user interface 160, due to size constraints of the work area of the storyboard 145. The thumbnail view 180 displays icons representing the content slides 155-N along with the navigation paths 150 that connect the content slides 155-N.

In step 217, the content slide navigating process 140-2 displays a boundary encompassing a portion of content slides 155-N in the thumbnail view 180. The boundary corresponds to the portion of content slides 155-N displayed in a work area on the graphical user interface 160. In an example embodiment, the number of content slides 155-N within the set of content slides 155-N is too many to fit within the work area of the storyboard 145 within the graphical user interface 160. The thumbnail view 180 displays a boundary that indicates which of the content slides 155-N are currently displayed within the graphical user interface 160.

In step 218, the content slide navigating process 140-2 receives a selection of the boundary in the thumbnail view 180 to modify the portion of content slides 155-N displayed in the work area to display an alternate portion of content slides 155-N in the work area on the graphical user interface 160. The content slide navigating process 140-2 allows a user 108 to select the boundary and reposition the boundary over a subset of the content slides 155-N such that those content slides 155-N now encompassed by the boundary are displayed in the work area of the storyboard 145 on the graphical user interface 160.

FIG. 10 is a flowchart of the steps performed by the content slide navigating process 140-2 when it allows a user 108 (such as a storyboard developer) of the graphical user interface 160 to alter a navigation path 150 between content slides 155-N.

In step 219, the content slide navigating process 140-2 allows a user 108 (such as a storyboard developer) of the graphical user interface 160 to alter a navigation path 150 between content slides 155-N to change the association of that navigation path 150 between at least one of the source content slide 165 and the destination content slide 175 to modify the presentation sequence of the content slides 155-N. A user 108, such as a storyboard developer, can modify the navigation paths 150 by manually modifying the navigation path 150 via the navigation path 150.

In step 220, the content slide navigating process 140-2 receives a graphical selection of a navigation path 150 displayed on the graphical user interface 160 between the source content slide 165 and the destination content slide 175. A user 108 can use an input device 116, such as a mouse to manipulate a pointer on the graphical user interface 160, to select a navigation path 150 on the graphical user interface 160.

In step 221, the content slide navigating process 140-2 receives a graphical selection to modify the navigation path 150 displayed on the graphical user interface 160 between the source content slide 165, and the destination content slide 175. The user 108 can modify a navigation path 150 by selecting the navigation path 150 and repositioning the navigation path 150.

In step 222, the content slide navigating process 140-2 receives a graphical selection to modify the navigation path 150 between the source content slide 165 and the destination content slide 175 to a new navigation path 150 between the source content slide 165 and a new destination content slide 175. In other words, the user 108 selected the navigation path 150 and repositioned the navigation path from the source content slide 165 to a new destination content slide 175 from which the source content slide 165 was previously connected.

In step 223, the content slide navigating process 140-2 modifies interaction properties 170 associated with the source content slide 165. The content slide navigating process 140-2 updates the interaction properties 170 associated with the source content slide 165 to indicate the source content slide 165 now has a navigation path 150 to a new destination content slide 175.

In step 224, the content slide navigating process 140-2 modify interaction properties 170 associated with the destination content slide 175. The content slide navigating process 140-2 updates the interaction properties 170 associated with the destination content slide 175 to indicate the destination content slide 175 is no longer connected to the source content slide 165 via a navigation path 150.

In step 225, the content slide navigating process 140-2 modify interaction properties 170 associated with the new destination content slide 175. The content slide navigating process 140-2 updates the interaction properties 170 associated with the new destination content slide 175 to indicate the new destination content slide 175 now has a navigation path 150 to the source content slide 165.

In step 226, the content slide navigating process 140-2 displays navigation path properties associated with the navigation path 150. Upon selection of the navigation path 150, the content slide navigating process 140-2 displays navigation path properties associated with the navigation path 150.

FIG. 11 is a flowchart of the steps performed by the content slide navigating process 140-2 when it allows a user 108 (such as a storyboard developer) of the graphical user interface 160 to alter a navigation path 150 between content slides 155-N.

In step 227, the content slide navigating process 140-2 allows a user 108 (such as a storyboard developer) of the graphical user interface 160 to alter a navigation path 150 between content slides 155-N to change the association of that navigation path 150 between at least one of the source content slide 165 and the destination content slide 175 to modify the presentation sequence of the content slides 155-N. A user 108, such as a storyboard developer, can modify the navigation paths 150 by manually selecting a destination content slide 175.

In step 228, the content slide navigating process 140-2 receives a graphical selection of the destination content slide 175 to modify the navigation path 150 displayed on the graphical user interface 160 between the source content slide 165 and the destination content slide 175. A user 108 selects the destination content slide 175 to modify a navigation path 150 associated with the destination content slide 175.

In step 229, the content slide navigating process 140-2 receives a graphical selection of the destination content slide 175 to modify the navigation path 150 between the source content slide 165, and the destination content slide 175, to a new navigation path 150 between a new source content slide 165 and the destination content slide 175. Essentially, the user 108 selects the destination content slide 175 and moves it to such that the destination content slide 175 is no longer connected to the source content slide 165 and is now connected to a new source content slide 165 via a new navigation path 150.

In step 230, the content slide navigating process 140-2 modifies interaction properties 170 associated with the source content slide 165. The content slide navigating process 140-2 updates the interaction properties 170 associated with the source content slide 165 to indicate the source content slide 165 no longer has a navigation path 150 to the destination content slide 175.

In step 231, the content slide navigating process 140-2 modifies interaction properties 170 associated with the destination content slide 175. The content slide navigating process 140-2 updates the interaction properties 170 associated with the destination content slide 175 to indicate the destination content slide 175 now has a new navigation path 150 to a new source content slide 165.

In step 232, the content slide navigating process 140-2 modifies interaction properties 170 associated with the new source content slide 165. The content slide navigating process 140-2 updates the interaction properties 170 associated with the new source content slide 165 to indicate that the new source content slide 165 has a navigation path 150 to a destination content slide 175.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method comprising:

displaying a set of content slides on a graphical user interface;

identifying navigation paths between content slides in the set of content slides, each navigation path indicating a destination content slide to be displayed after a source content slide upon selection of a navigation choice during a presentation sequence of the content slides, wherein the source content slide includes a multiple-choice question displayed during the presentation sequence of the slides, wherein each answer choice available for selection results in a different destination slide being subsequently presented during the presentation sequence of the content slides;

for each identified navigation path, displaying a visualization of that navigation path on the graphical user interface between the source content slide and the destination content slide associated with that navigation path including color coding navigation paths to indicate additional interaction information associated with the content slides, wherein a pre-determined color code indicates an unsuccessful interaction between the source content slide and the destination content slide;

allowing, via the graphical user interface, alteration of a navigation path between content slides to change the association of that navigation path between at least one of the source content slide and the destination content slide to modify the presentation sequence of the content slides including receiving a graphical selection of a navigation path displayed on the graphical user interface between the source content slide and the destination content slide and, in response to the selection, displaying navigation path properties associated with the selected navigation path;

displaying interaction properties associated with a navigation path, the interaction properties defining metrics assigned to the navigation choice associated with the navigation path within the content slide; and allowing, via the graphical user interface, alteration of the interaction properties associated with the navigation path by altering a ranking associated with the navigation choice, the ranking used during the presentation sequence to maintain a cumulative total point assigned to a user based on a set of navigation choices received during the presentation sequence.

2. The method of claim 1 comprising:

performing operations of displaying a set of content slides, displaying a visualization of navigation paths, allowing, via the graphical user interface, alteration of a navigation path between content slides, displaying interaction properties and allowing, via the graphical user interface, alteration of interaction components associated with the navigation path within a single common graphical user interface.

3. The method of claim 1 wherein identifying navigation paths between content slides in the set of content slides comprises:

identifying a plurality of navigation paths between a source content slide and a plurality of destination content slides.

4. The method of claim 1 wherein displaying a visualization of that navigation path on the graphical user interface between the source content slide and the destination content slide associated with that navigation path comprises:

in response to receiving an input via the graphical user interface, displaying a subset of the set of content slides on the graphical user interface.

5. The method of claim 4 wherein displaying a subset of the set of content slides on the graphical user interface comprises:
receiving a graphical selection of the source content slide; and
displaying a subset of content slides containing:
i) a portion of the content slides within the set of content slides, including the source content slide; and
ii) the navigation paths between the content slides in the subset of content slides.

6. The method of claim 5 comprising:
in response to receiving input, via the graphical user interface, toggling between displaying:
i) the set of content slides and the navigation paths between the content slides; and
ii) the subset of content slides including the source content slide, and the navigation paths between the subset of content slides.

7. The method of claim 4 wherein displaying a subset of the set of content slides on the graphical user interface comprises:
providing a thumbnail view of the set of content slides on the graphical user interface.

8. The method of claim 7 wherein providing a thumbnail view of the set of content slides on the graphical user interface comprises:
displaying a boundary encompassing a portion of content slides in the thumbnail view, the boundary corresponding to the portion of content slides displayed in a work area on the graphical user interface.

9. The method of claim 8 wherein displaying a boundary encompassing a portion of content slides in the thumbnail view comprises:
receiving a selection of the boundary in the thumbnail view to modify the portion of content slides displayed in the work area to display an alternate portion of content slides in the work area on the graphical user interface.

10. The method of claim 1 wherein allowing, via the graphical user interface, alteration of a navigation path between content slides comprises:
receiving a graphical selection of a navigation path displayed on the graphical user interface between the source content slide and the destination content slide; and
displaying navigation path properties associated with the navigation path in response to the selection.

11. The method of claim 10 wherein receiving a graphical selection of a navigation path displayed on the graphical user interface between the source content slide and the destination content slide comprises:
receiving a graphical selection to modify the navigation path displayed on the graphical user interface between the source content slide and the destination content slide;
modifying interaction properties associated with the source content slide; and
modifying interaction properties associated with the destination content slide.

12. The method of claim 11 wherein receiving a graphical selection to modify the navigation path displayed on the graphical user interface between a source content slide and a destination content slide comprises:
receiving a graphical selection to modify the navigation path between the source content slide and the destination content slide to a new navigation path between the source content slide and a new destination content slide; and further comprising:
modifying interaction properties associated with the new destination content slide.

13. The method of claim 12 wherein allowing, via the graphical user interface, alteration of a navigation path between content slides comprises:
receiving a graphical selection of the destination content slide to modify the navigation path displayed on the graphical user interface between the source content slide and the destination content slide; and
modifying interaction properties associated with the source content slide; and
modifying interaction properties associated with the destination content slide.

14. The method of claim 13 wherein receiving a graphical selection of the destination content slide to modify the navigation path displayed on the graphical user interface between the source content slide and the destination content slide comprises:
receiving a graphical selection of the destination content slide to modify the navigation path between the source content slide and the destination content slide to a new navigation path between a new source content slide and the destination content slide; and
further comprising:
modifying interaction properties associated with the new source content slide.

15. The method of claim 14, wherein allowing, via the graphical user interface, alteration of the interaction properties associated with the navigation path comprises:
altering a ranking associated with the navigation choice, the ranking used during the presentation sequence to maintain a cumulative total point assigned to a user based on a set of navigation choices received during the presentation sequence; and
wherein the source content slide includes a multiple-choice question displayed during the presentation sequence of the slides, wherein each answer choice available for selection results in a different destination slide being subsequently presented during the presentation sequence of the content slides; further comprising:
displaying a resulting score based on answer choices received on a plurality of multiple-choice question slides, the resulting score being displayed during the presentation sequence of the content slides.

16. The method of claim 15, wherein displaying a visualization of that navigation path on the graphical user interface between the source content slide and the destination content slide associated with that navigation path comprises:
in response to receiving an input via the graphical user interface, displaying a subset of the set of content slides on the graphical user interface; wherein displaying a subset of the set of content slides on the graphical user interface comprises:
receiving a graphical selection of the source content slide; and
displaying a subset of content slides containing:
i) a portion of the content slides within the set of content slides, including the source content slide; and
ii) the navigation paths between the content slides in the subset of content slides.

17. The method of claim 1, further comprising displaying a resulting score based on answer choices received on a plurality of multiple-choice question slides, the resulting score being displayed during the presentation sequence of the content slides.

18. The method of claim 17, wherein allowing, via the graphical user interface, alteration of the interaction properties associated with the navigation path comprises:
   altering the interaction properties associated with the navigation path by identifying a number of attempts allowed for receiving choices for the plurality of multiple-choice question slides.

19. The method of claim 17, wherein allowing, via the graphical user interface, alteration of the interaction properties associated with the navigation path comprises:
   altering the interaction properties associated with the navigation path by identifying a default navigation path coupling the source content slide to a default destination slide that the presentation sequence follows after expiration of a time limit in the absence of receiving a navigation input during the presentation sequence of the content slides.

20. A computerized device comprising:
   a memory;
   a processor;
   a communications interface;
   an interconnection mechanism coupling the memory, the processor and the communications interface;
   wherein the memory is encoded with a content slide navigation application that when executed on the processor is capable of displaying the navigation of content slides on the computerized device by performing the operations of:
      displaying a set of content slides on a graphical user interface;
      identifying navigation paths between content slides in the set of content slides, each navigation path indicating a destination content slide to be displayed after a source content slide upon selection of a navigation choice during a presentation sequence of the content slides;
      for each identified navigation path, displaying a visualization of that navigation path on the graphical user interface between the source content slide and the destination content slide associated with that navigation path;
      allowing, via the graphical user interface, alteration of a navigation path between content slides to change the association of that navigation path between at least one of the source content slide and the destination content slide to modify the presentation sequence of the content slides including receiving a graphical selection of a navigation path displayed on the graphical user interface between the source content slide and the destination content slide and displaying navigation path properties associated with the selected navigation path in response to the selection;
      displaying interaction properties associated with a navigation path, the interaction properties defining metrics assigned to the navigation choice associated with the navigation path within the content slide; and
      allowing, via the graphical user interface, alteration of the interaction properties associated with the navigation path.

21. The computerized device of claim 20 wherein when the computerized device performs the operation of allowing a user of the graphical user interface to alter the interaction properties associated with the navigation path, the computerized device is capable of performing the operation of:
   altering a ranking associated with the navigation choice, the ranking used during the presentation sequence to maintain a cumulative total point assigned to a user based on a set of navigation choices chosen by the user during the presentation sequence.

22. A computer readable medium encoded with computer programming logic that when executed on a process in a computerized device provides content slide navigating, the medium comprising:
   means for displaying a set of content slides on a graphical user interface;
   means for identifying navigation paths between content slides in the set of content slides, each navigation path indicating a destination content slide to be displayed after a source content slide upon selection of a navigation choice during a presentation sequence of the content slides;
   for each identified navigation path, means for displaying a visualization of that navigation path on the graphical user interface between the source content slide and the destination content slide associated with that navigation path;
   means for allowing, via the graphical user interface, alteration of a navigation path between content slides to change the association of that navigation path between at least one of the source content slide and the destination content slide to modify the presentation sequence of the content slides including receiving a graphical selection of a navigation path displayed on the graphical user interface between the source content slide and the destination content slide and displaying navigation path properties associated with the selected navigation path in response to the selection;
   means for displaying interaction properties associated with a navigation path, the interaction properties defining metrics assigned to the navigation choice associated with the navigation path within the content slide; and
   means for allowing, via the graphical user interface, alteration of the interaction properties associated with the navigation path.

* * * * *